US012737475B2

(12) United States Patent
Phokela et al.

(10) Patent No.: US 12,737,475 B2
(45) Date of Patent: Sep. 15, 2026

(54) MULTI-GRANULAR ELASTIC TRUST LABELING FRAMEWORK FOR SOFTWARE DELIVERY

(71) Applicant: Accenture Global Solutions Limited, Dublin (IE)

(72) Inventors: Kanchanjot Kaur Phokela, New Delhi (IN); Narendranath Sukhavasi, Nizamabad (IN); Kuntal Dey, Birbhum (IN); Kapil Singi, Bangalore (IN); Vikrant Kaulgud, Pune (IN); Adam Patten Burden, Tampa, FL (US)

(73) Assignee: Accenture Global Solutions Limited, Dublin (IE)

( * ) Notice: Subject to any disclaimer, the term of this patent is extended or adjusted under 35 U.S.C. 154(b) by 569 days.

(21) Appl. No.: 18/340,550

(22) Filed: Jun. 23, 2023

(65) Prior Publication Data

US 2023/0418952 A1 Dec. 28, 2023

(30) Foreign Application Priority Data

Jun. 23, 2022 (IN) ............................ 202241036211

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .. G06F 21/577; G06F 2221/033; G06F 11/36; G06F 11/3692; G06F 11/3696; G06F 21/57; G06F 18/29; G05B 19/048; G05B 13/0265; H04L 63/1433; H04L 63/1441; H04L 43/04; H04L 43/045
See application file for complete search history.

(56) References Cited

U.S. PATENT DOCUMENTS 8,392,997 B2 3/2013 Chen et al.
9,021,584 B2 4/2015 Zaitsev
9,965,627 B2 5/2018 Ray et al.
(Continued)

OTHER PUBLICATIONS

Sharma, R., Sibal, R., Sabharwal, S. (2019). Software Vulnerability Prioritization: A Comparative Study Using TOPSIS and VIKOR Techniques. In: Kapur, P., Klochkov, Y., Verma, A., Singh, G. (eds) System Performance and Management Analytics. Asset Analytics. Springer, Singapore. (Year: 2019).*
(Continued)

*Primary Examiner* — Oscar A Louie
(74) *Attorney, Agent, or Firm* — Seed Intellectual Property Law Group LLP

(57) ABSTRACT

Systems and methods supporting discovery and quantification of vulnerabilities in software code are disclosed. The systems and methods provide functionality for using software code analysis and other types of tools to analyze the software code and determine whether it can be trusted. The software code tools may be able to discover various hidden issues in the software code and the outputs of such tools may be normalized to quantify the risk associated with vulnerabilities identified by the different tools. A labeling strategy is provided to label the software code to enable users to identify the best software among various available software options based on the label(s) and a set of criteria.

20 Claims, 5 Drawing Sheets

(56) References Cited

U.S. PATENT DOCUMENTS

| | | | | |
|---|---|---|---|---|
| 9,977,905 | B2 | 5/2018 | Li | |
| 10,721,210 | B2 | 7/2020 | Schiappa et al. | |
| 10,817,604 | B1 * | 10/2020 | Kimball | G06F 21/563 |
| 11,080,387 | B1 * | 8/2021 | Lattin | G06F 21/121 |
| 11,947,946 | B1 * | 4/2024 | Rao | G06N 20/20 |
| 2016/0248794 | A1 * | 8/2016 | Cam | H04L 63/1433 |
| 2019/0065032 | A1 * | 2/2019 | Lin | G06F 3/04842 |
| 2020/0285757 | A1 | 9/2020 | Bhalla et al. | |
| 2022/0108020 | A1 * | 4/2022 | Dang | G06F 8/658 |
| 2023/0041068 | A1 * | 2/2023 | Starin | G06F 11/3698 |
| 2023/0367911 | A1 * | 11/2023 | Balber | G06N 3/0464 |
| 2024/0241963 | A1 * | 7/2024 | Wareus | G06F 21/577 |

OTHER PUBLICATIONS

Agarwal, M. et al., “Modeling Software Vulnerability Injection-Discovery Process Incorporating Time-Delay and VIKOR Based Ranking,” Reliability and Maintainability Assessment of Industrial Systems, Springer, Cham, 2022, pp. 239-256.

Alsubaei, F. et al., “A framework for ranking IoMT solutions based on measuring security and privacy,” Proceedings of the Future Technologies Conference, Springer, Cham, 2018, pp. 205-224.

Baldini, G. et al., “Security certification and labelling in internet of things,” 2016 IEEE 3rd World Forum on Internet of Things (WF-IoT), IEEE, 2016, pp. 627-632.

Brucker, A. D. et al., “Modelling, validating, and ranking of secure service compositions,” Software: Practice and Experience, vol. 47, No. 12, 2017, pp. 1923-1943.

Gasiba, T. et al., “Ranking secure coding guidelines for software developer awareness training in the industry,” First International Computer Programming Education Conference (ICPEC 2020), Schloss Dagstuhl-Liebniz-Zentrum für Informatik, 2020, 13 pages.

Jimenez, M. et al., “The importance of accounting for real-world labelling when predicting software vulnerabilities,” Proceedings of the 2019 27th ACM Joint Meeting on European Software Engineering Conference and Symposium on the Foundations of Software Engineering, 2019, pp. 695-705.

Johnson, S. D. et al., “The impact of IoT security labelling on consumer product choice and willingness to pay,” PloS one, vol. 15, No. 1, 2020, 21 pages.

Wiseman, S. et al., “Adding security labelling to Windows NT,” Information Security Technical Report, vol. 3, No. 3, 1998, pp. 44-52.

Zoppi, T. et al., “Preseing the proper data to the crisis management operator: A relevance labelling strategy,” 2016 IEEE 17th International Symposium on High Assurance Systems Engineering (HASE), IEEE, 2016, pp. 228-235.

* cited by examiner 300
310L
320L
330L
300L
311
312
313
314
315
316
317
318
322
324
326
328
332
334
336
338
310
320
330

MULTI-GRANULAR ELASTIC TRUST LABELING FRAMEWORK FOR SOFTWARE DELIVERY

CROSS-REFERENCE TO RELATED APPLICATIONS

The present application claims the benefit of priority from Indian Provisional Application No. 202241036211 filed Jun. 23, 2022 and entitled "MULTI-GRANULAR ELASTIC TRUST LABELING FRAMEWORK FOR SOFTWARE DELIVERY," the disclosure of which is incorporated by reference herein in its entirety.

TECHNICAL FIELD

The present invention relates generally to software code testing and more specifically to identifying software code vulnerabilities and quantifying trust of the software code given the identified vulnerabilities and a set of criteria.

BACKGROUND OF THE INVENTION

Presently, there are often numerous software packages and applications available in the market for the same purpose, such as software for supporting particular types of functionality (e.g., accounting, fleet management, word processing, e-mail, and other more complex applications). Given the myriad of available choices, it can be a difficult task to choose among the available applications. Furthermore, it can be difficult to determine whether a selected or candidate application has been built using appropriate coding standards, such as standards designed to ensure the software to work properly or to be secure. Presently, developers or other personnel (e.g., information technology (IT) personnel, system administrators, etc.) utilize many third-party tools to analyze selected software and identify or detect potential or actual vulnerabilities and leakages.

These different tools may evaluate software differently, such as identifying different types of vulnerabilities, analyzing different features of the software (e.g., code, execution environments, application programming interfaces (APIs), encryption capabilities, and the like) and outputs and analysis of the different tools may not be compatible with other tools being used, which makes it difficult to verify that all vulnerabilities or configuration issues have been identified. To illustrate, existing software code analysis tools examine software and may produce a report of vulnerabilities that are ranked by severity—however, the vulnerability severity ranking (e.g., high, medium, low, critical, etc.) of each tool is limited by the tool's accumulated knowledge, thus making each tool's vulnerability ranking different (e.g., one tool may rank a vulnerability as a high risk while another tool may rank the same vulnerability as medium or low risk). Thus, not only is it difficult to ensure all vulnerabilities have been identified using existing tools, but also to verify that the ranking of the identified vulnerabilities between different tools is consistent.

As a result of these challenges, it can be difficult to evaluate the trustworthiness of software and implement strategies to mitigate or correct the identified vulnerabilities, whether such mitigation involves selecting a different application or modifying the application to secure any identified vulnerabilities. For example, using one tool may indicate low risk vulnerabilities and using another tool may identify those same or different vulnerabilities as medium or high risk, making it difficult to determine or properly assess the vulnerabilities of the software and the risks presented by the software. Additionally, the use of various independent third-party tools may also create challenges with respect to understanding issues that may be encountered in the future for a given piece of software, resulting in an inability to appropriately assess potential risks that may arise if one piece of software is selected over another piece of software.

Furthermore, updates to a selected piece of software or new versions of the software require similar testing and analysis to ensure that any changes to the software as a result of the update or new version did not introduce security or other types of vulnerabilities. Thus, even after a piece of software has undergone significant analysis using the various available tools that exist today, the challenge of evaluating the trustworthiness of the software remains a perpetual responsibility of the IT or other personnel responsible for ensuring the systems on which the software runs are safe and secure and creates significant uncertainties with respect to predicting the potential impact that vulnerabilities in the software may have over time.

BRIEF SUMMARY OF THE INVENTION

Systems and methods supporting discovery and quantification of vulnerabilities in software code are disclosed. The systems and methods provide functionality for using software code analysis and other types of tools to analyze the software code and determine whether it can be trusted. The software code tools may be able to discover various hidden issues in the software code and the outputs of such tools may be normalized to quantify the risk associated with vulnerabilities identified by the different tools. A labeling strategy is provided to label the software code to enable users to identify the best software among various available software options based on the label(s) and a set of criteria.

BRIEF DESCRIPTION OF THE DRAWINGS

For a more complete understanding of the present invention, reference is now made to the following descriptions taken in conjunction with the accompanying drawing, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

Systems and methods supporting discovery and quantification of vulnerabilities in software code are disclosed. The systems and methods provide functionality for using software code analysis and other types of tools to analyze the software code and determine whether it can be trusted. The software code tools may be able to discover various hidden issues in the software code and the outputs of such tools may be normalized to quantify the risk associated with vulnerabilities identified by the different tools. A labeling strategy is provided to label the software code to enable users to identify the best software among various available software options based on the label(s) and a set of criteria.

Figure 1:
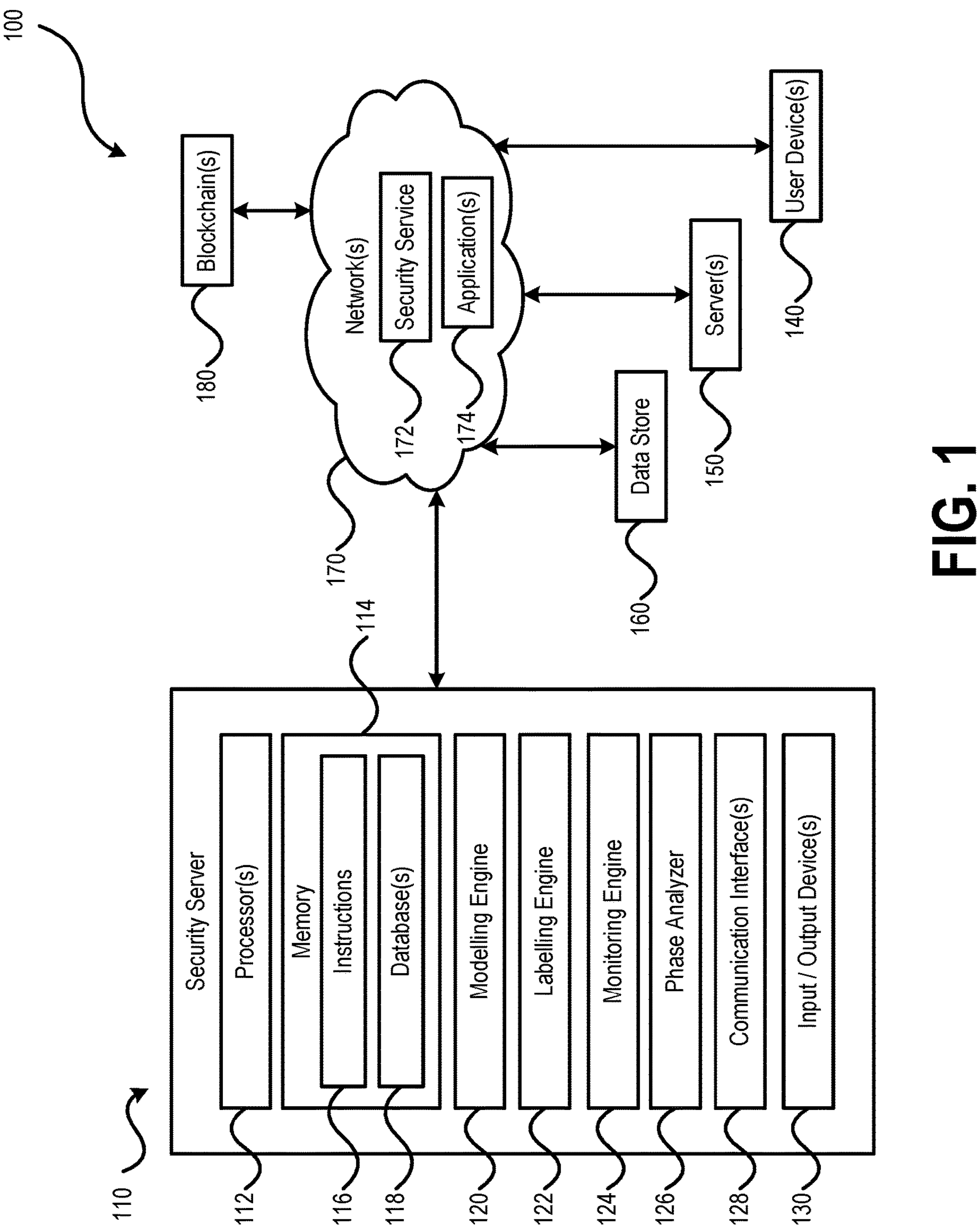
FIG. 1 shows a block diagram of an exemplary system for evaluating software vulnerabilities in accordance with the present disclosure.

Referring to FIG. 1, a block diagram of an exemplary system for evaluating software vulnerabilities in accordance with the present disclosure is shown as a system 100. As shown in FIG. 1, the system 100 includes a security server 110 having one or more processors 112, a memory 114, a modelling engine 120, a labelling engine 122, a monitoring engine 124, a phase analyzer 126, one or more communications interfaces 128, and one or more input/output devices 130. These various components of the security server 110 are configured to provide functionality to support evaluation of software vulnerabilities in a manner that provides improved vulnerability identification, consistent ranking of identified vulnerabilities, and application of labels to the software in various ways. The features and functionality of the security server 110 provide enhanced software trustworthiness assessments that are more easily understood by IT personnel and overcome the above-described drawbacks of existing techniques and tools with respect to evaluating vulnerabilities of software, as described in more detail below.

Each of the one or more processors 112 may be a central processing unit (CPU) or other computing circuitry (e.g., a microcontroller, one or more application specific integrated circuits (ASICs), and the like) and may have one or more processing cores. The memory 114 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 114 may store instructions 116 that, when executed by the one or more processors 112, cause the one or more processors 112 to perform the operations described in connection with the security server 110 and the functionality described with reference to FIGS. 1-5.

The one or more communication interfaces 128 may be configured to communicatively couple the security server 110 to the one or more networks 170 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 130 may include one or more display devices, a keyboard, a stylus, one or more touchscreens, a mouse, a trackpad, a camera, one or more speakers, haptic feedback devices, or other types of devices that enable a user to receive information from or provide information to the security server 110. It is noted that while shown in FIG. 1 as including the I/O devices 130, in some implementations the functionality of the security server 110 may be accessed remotely by a user, such as via a communication link established between a user device 140 and the security server 110 over the one or more networks 170. Furthermore, it should be understood that the functionality provided by the security server 110 may also be deployed and accessed by the user in other arrangements, such as via a cloud-based implementation shown as cloud-based security service 172, as an application accessible via a web browser of the user device 140, as an application running on the user device 140, or other types of implementations.

The modelling engine 120 may be configured to create a model for use in evaluating vulnerabilities of applications and/or application labelling. For example, the model may be a knowledge model designed or generated based on defined security practices, standards, and regulations around application specific artifacts (e.g., languages, configurations, etc.). In an aspect, the knowledge model may be at least partially defined or generated by a user, such as a subject matter expert (SME). To illustrate, the SME may identify various categories of regulations, rules based on security standards/practices, and business domain information that may be utilized for standardization and labeling of an output by an analysis tool. The SME may also identify and extend ontologies (e.g., provenance (PROV) ontologies) or other types of information that may be used to record and identify operations to normalize tool outputs (e.g., create a uniform standard/classification for vulnerabilities across different tools). The ontologies and information provided by the SME may increase transparency with respect to system vulnerability detection. The model may be configured to rank and store vulnerabilities in a knowledge graph. In an aspect, the ranking and storage of the vulnerabilities may leverage the Common Vulnerability Scoring System (CVSS V3) or other standards and information, such as security practices schemas.

In an aspect, manual and/or automated methods may be utilized to govern the labelling and consolidation of tool output rankings based on the characteristics and parameters for evaluating the application, which may enable vulnerability rankings from different tools to be standardized so that vulnerability rankings can be presented to a user in a manner that is consistent across different tools. In addition to the above-types of information, the modelling engine 120 may provide functionality to support acquisition of additional types of data that may be used for generating the model. For example, the modelling engine 120 may enable a user to compile or gather information about working environments and dependencies for applications or software under evaluation. In an aspect, such information may be provided by the user based on the environment where the application is to be deployed, as well as working specifications and architecture information for the application. Such information may depict the application's control/data flow, data units, and other information associated with application artifacts.

The additional types of information used to generate the model may also include event logs generated by the tools, which helps in maintaining a lineage of activities performed for the tool across the software delivery lifecycle. In an aspect, the modelling engine 120 or another component may provide event parsing logic for analysis of the log information. For example, the logs generated by vulnerability analysis tools while performing software vulnerability analysis and standardization and normalization information for tool outputs may be parsed by the parsing logic and stored in accordance with the ontology specifications. The specifications of the application and the characteristics of the tool, such as their ranking mechanisms or rules, may be used to evaluate tool outputs and rules applied by the tools to capture the vulnerability rankings for purposes of enabling standardization of the tool outputs.

The monitoring engine 124 is configured to provide functionality for monitoring aspects of a software development lifecycle (SDLC) and evaluating the software at different stages of the SDLC. For example, the monitoring engine 124 may include an event listener configured to monitor various development phases of software applications, such as design, development, testing, deployment, and maintenance phases of the software to detect changes in the software. The event listener functionality of the monitoring engine 124 also detects changes to the deployment or runtime environments, such as whether the software is running on a particular cloud platform, hardware configuration, network configuration, and the like and records information about the deployment environment. In addition to the information described above, the event listener may also identify dependencies for the application (e.g., runtime requirements, environment parameters, software libraries, and the like) for the software and may record dependency information. The monitoring engine 124 may further provide functionality for tracking various tools that may be run against the software. The exemplary types of information described above as being captured by the event listener functionality of the monitoring engine 124 may be stored at a database, such as one of the databases 118 stored in the memory 114 of the security server 110.

In an aspect, the types of information captured by the monitoring engine 124 may additionally include information associated with the code of the software. For example, when a particular event occurs in the SDLC, such as finishing coding of a build or version of the software, one or more hashes of the code may be captured. This hash value(s) may be stored with other information in the one or more databases 118 and used to evaluate the software in terms of security or other metrics, such as to verify all or particular portions of the code have not been altered (e.g., if a particular piece of the code changes the hash value for other, allegedly unchanged portions of the code, it may be checked to verify no code changes were made). The hash values may also be used to speed up the analysis of the code. For example, tools may not need to be run on portions of the code for which the hash value(s) indicate no coding changes were made, thereby reducing the amount of analysis that needs to be performed as development of the software progresses and when updates are created, only those portions of the code impacted by the update (e.g., where changes were made to the code in view of the update) may need to be evaluated to verify the security or trustworthiness of the software.

The phase analyzer 126 is configured to provide functionality for identifying software vulnerabilities during different phases of the SDLC. For example, different stakeholders (e.g., software or code architects, testers, auditors, software users, etc.) involved a software delivery process may be interested in finding insights into the vulnerabilities and trustworthiness of software at different phases of the SDLC (e.g., design, development, testing, deployment, and maintenance phases). The portions of the software of interest with respect to these different phases of the SDLC may involve various functionalities or features associated with the software depending on the particular phase involved, such as client requirements adherence, security considerations, maintainability, performance issues generated due to system architecture, coding, build status, and other factors. The phase analyzer 126 may run or allow a user to run various vulnerability diagnostic tools during the different phases and capture information associated with the tool outputs. In some aspects, the tool(s) may be run multiple times against the software during one or more SDLC phases. Information captured or output by these tools as they are executed against the software at any particular phase of the SDLC may be stored in the one or more databases 118. In an aspect, the information may further identify the particular phase in which the tool data was captured, timestamp information, version or build data for the software, other types of information, or combinations thereof.

The labelling engine 122 is configured to generate labels indicative of the trustworthiness, security, or other characteristics of the software based on the information captured by the monitoring engine 124, the phase analyzer 126, and the model(s) created by the modelling engine 120. For example, the labelling engine 122 may generate an activity trust label for the software activities detected by the event listener functionality of the monitoring engine 124 and outputs of any tools used to evaluate the software in connection with such detected activities. To illustrate, a software application may be assessed based on various operational as well as quality factors to generate a trusted/security ranking for the application. In an aspect, the model generated using the functionality of the modelling engine 120 may be utilized to identify the operational factors, quality factors, or other criteria upon which the trust or security ranking is determined for the detected activities. In determining the trust or security ranking there may be specific tools used to assess or evaluate the software in response to each of the various activities.

In an aspect, a knowledge graph may be used to identify or determine the coverage provided by the tool(s) applied for each activity. As an example, coverage of National Institute of Standards and Technology (NIST) standards for each tool may be used to determine which portions of the standards are covered by or analyzed by each tool. As described in more detail below, the coverage provided by various tools may be used to standardize scoring across tools, which may enable the tools or tool outputs to also be ranked in a consistent manner. For example, the analysis of the tools and/or tool outputs may enable identified vulnerabilities or bugs to be categorized, such as by using common vulnerability scoring system (CVSS) guidelines into various vulnerability categories, such as low, medium, high, and critical categories. Based on the analysis of the tool, its coverage ratio, as well as the CVSS guidelines, an application vector may be generated. The application vector may provide a normalized and standardized ranking that depicts the regulation-specific ranking of the application or software and identified vulnerabilities. To illustrate, a positive vector may depict a best-case scenario and a negative vector may depict a worst-case scenario for an application ranking with respect to one or more factors upon which the software is being evaluated (e.g., security, encryption capabilities, memory leaks, etc.). The rules utilized by the tools may be categorized into or mapped to a CVSS specific ranking or criterion.

Taking the coverage of the tools (e.g., as may be calculated using the knowledge graph described above) into consideration, and the severity of the rules, a negative vector and a positive vector may be created which may be used to evaluate the software based on the analysis of the tools and their respective outputs. As can be appreciated from the above, the final ranking may be based on multiple pieces of information, such as evaluation of the software based on tool outputs, coverage, and other factors. As such, the evaluation of the software and any identified vulnerabilities may need to account for these various factors. In an aspect, such evaluation may leverage a multiple-criteria decision analysis (MCDA) technique, such as a technique for order of preference by similarity to ideal solution (TOPSIS), to identify the actual fitting of software security or other factors to the rules (e.g., based on the model) based on the coverage provided by the tool(s) and the sensitivity of the rules implemented by the tools to evaluate the software.

Figure 2:
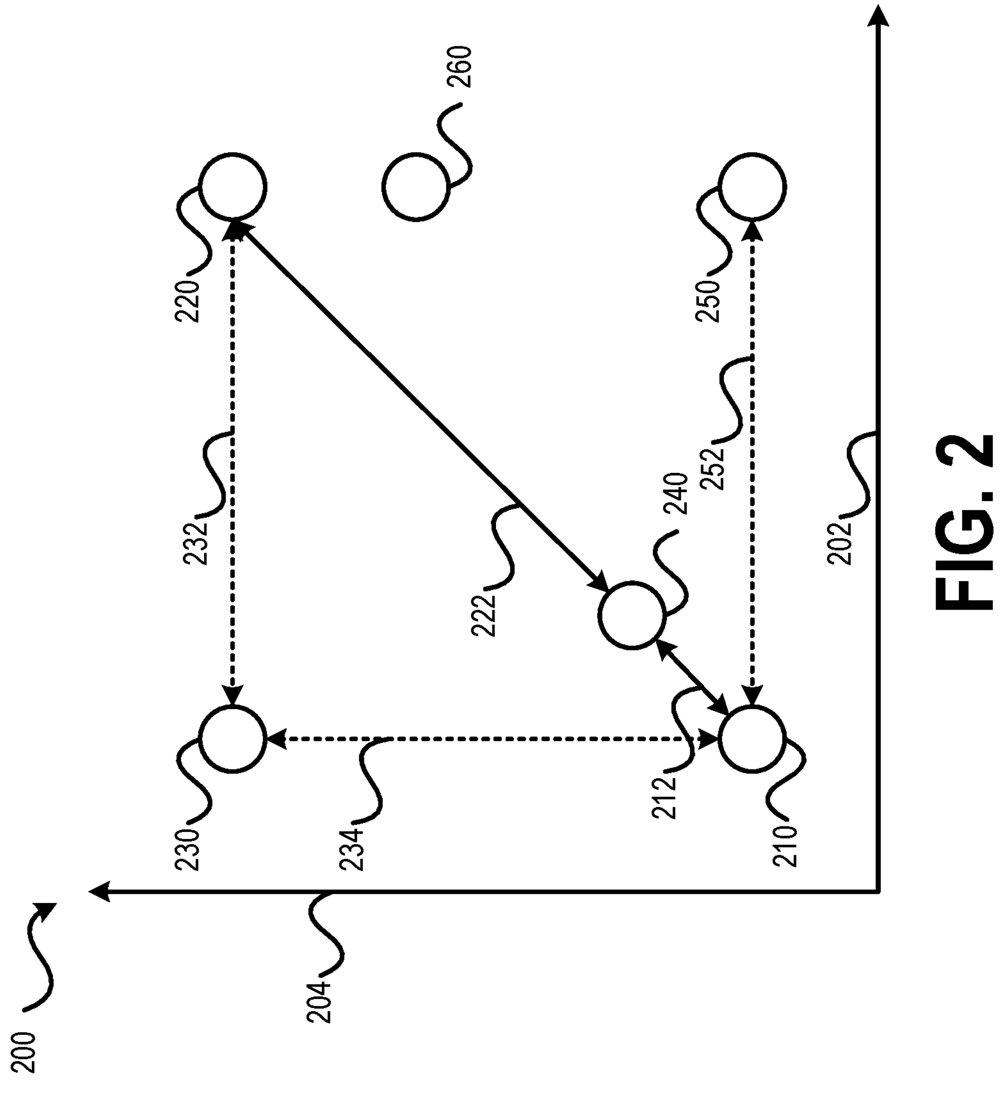
FIG. 2 shows a diagram illustrating exemplary aspects of utilizing a TOPSIS technique to evaluate software vulnerabilities in accordance with the present disclosure.

To illustrate and referring to FIG. 2, a diagram illustrating exemplary aspects of utilizing a TOPSIS technique to evaluate software vulnerabilities in accordance with the present disclosure is shown. In FIG. 2 a horizontal axis 202 and a vertical axis 204 are shown. The axes 202, 204 represent the fit of software to different criteria, where axis 202 corresponds to a first criterion and axis 204 corresponds to a second criterion. In the example of FIG. 2, a piece of software may be said to fit well with the first criterion the closer it lies to the origin along the horizontal axis 202 and to fit well with the second criterion the closer it lies to the origin along the vertical axis 204. Thus, an ideal software solution may be represented as software 210 and a negative ideal software solution (i.e., a software solution maximally not a good fit to the criteria represented in the diagram) may be represented as software 220.

Now, suppose that 4 different pieces tools 230, 240, 250, 260 are used to evaluated a piece of software and are determined to be a fit based on the first and second criteria as shown in the diagram 200. As can be appreciated from the positions of each tool 230-260 (or tool output) shown in FIG. 2, tool 230 may approximate an ideal fit for the criteria corresponding to the axis 202 (e.g., as indicated by arrow 234 aligning tool 230 with the ideal solution 210 with respect to distance from the origin along axis 202) but approximates a maximally non-ideal fit for the criteria corresponding to the axis 204 (e.g., as indicated by arrow 232 aligning tool 230 with the non-ideal solution 220 with respect to distance from the origin along axis 204). Similarly, the tool 250 approximates the ideal solution 210 with respect to the criteria corresponding to axis 204 (e.g., as indicated by arrow 252 aligning tool 250 with the ideal solution 210 with respect to distance from the origin along axis 204) but is a maximally negative fit with respect to the criteria corresponding to axis 202 (e.g., because tool 250 approximately aligns with the non-ideal solution 220 with respect to distance from the origin along axis 202). Tool 260 is the worst fit for the two criteria corresponding to the axes 202, 204, as indicated by its position being plotted along the axes 202, 204 closest to the non-ideal solution 220. Furthermore, it can be seen in FIG. 2 that the tool 240 provides the best solution because, while not being a maximally best fit for the criteria of either axis, as in tool 230 (i.e., the maximally best fit for the criteria of axis 202) and tool 250 (i.e., the maximally best fit for the criteria of axis 204), it provides the shortest distance to the ideal software solution 210 and is therefore a better fit with respect to both the first and second criteria (i.e., solution 240 has a positive distance 212 to the ideal solution 210 and a negative distance 222 from the non-ideal solution 220). An exemplary process for calculating a distance ratio (i.e., a ratio of the distance between an application under test and the positive and negative ideal solutions) is described in more detail below. It is noted that while FIG. 2 shows a diagram plotting the fit of software for 2 criteria, in additional or alternative aspects additional axes could be utilized to determine the fit of one or more pieces of software to more than 2 criteria if desired.

Referring back to FIG. 1, in evaluating the fit of tools (or tool outputs) to various criteria a weighting may be associated with each criterion to indicate the significance or importance of each criteria from the perspective of the stakeholder. The weighting may enable different software stakeholders to prioritize the criteria differently depending on the use case for which each stakeholder intends to use the software. For example, a first stakeholder may handle personally identifiable information subject to government or industry requirements for data privacy and may place a higher priority on data encryption and data security features of the tool while a second stakeholder may intend to utilize the tool in a use case where such factors are not as important. Thus, the first stakeholder may weight encryption and security criteria more heavily than the second stakeholder, who may prioritize other criteria higher than the first stakeholder (e.g., throughput or speed criteria). The ability to weight criteria in this manner may enable appropriate evaluation of many factors or criteria for software in a manner that accounts for the needs of the stakeholder while providing a uniform framework for evaluating the software (e.g., the same tools can be used by the different stakeholders to obtain results according to their individualized needs).

In an aspect, scores for each criterion may be normalized and a geometric distance between each tools alternative and the ideal alternative (e.g., the ideal solution 210 of FIG. 2) may be determined. In an aspect, the fit of the tools to the various criteria may be used to generate a ranking of the tools, such as a ranking that indicates an overall (or normalized) fit of the tool to the criteria of interest, and the ranking may then be converted into a label that may be applied to or associated with the software. Such a label may enable a user to more easily interpret the features of the software and to evaluate whether the software meets the user's needs. In additional or alternative aspects, multiple labels may be generated, such as to indicate a ranking or fit to criteria according to specific criteria priorities (or weights). To illustrate and using the example above involving the first and second stakeholders, the label may incorporate a ranking where security, data privacy, or other similar criteria are prioritized over other criteria considered during evaluation of the software, and may incorporate an additional ranking where throughput, speed of execution, or other criteria are prioritized over security, data privacy, and other similar criteria. Such labels may more readily facilitate more robust understanding of the software capabilities and provide for instant evaluation of the suitability of different pieces of software according to different prioritizations of various criteria by different stakeholders. In an aspect, the rankings may be based, at least in part, on an industry standard, such as a standard promulgated by NIST. Additionally, in some aspects a score may be incorporated into the label, where the score may be based on a fit between the various criteria under consideration and the standard, or the criteria upon which the fit is determined may be based on the standard and the score may indicate a quality of the fit to the criteria.

As described above, the labelling engine 122 may apply labels based on different activities that occur during the SDLC. For example, labels, rankings, and/or scores may be generated in connection with activities corresponding to release integrity, process compliance activities, third party artifacts, or other types of activities. The labelling engine 122 may additionally or alternatively generate labels for the software according to portions of the SDLC. For example, labels may also be generated for different phases (e.g., development, design, data, operation and/or maintenance, operating environment, and the like), as described in more detail below. Additionally or alternatively, the labelling engine 122 may generate a composite label for the activity and/or phases of the software, which may take into account or be based on individual rankings/scores for the various activities and/or phases. To provide a holistic view of the software capabilities, an application level label may also generated by the labelling engine 122.

Figure 3:
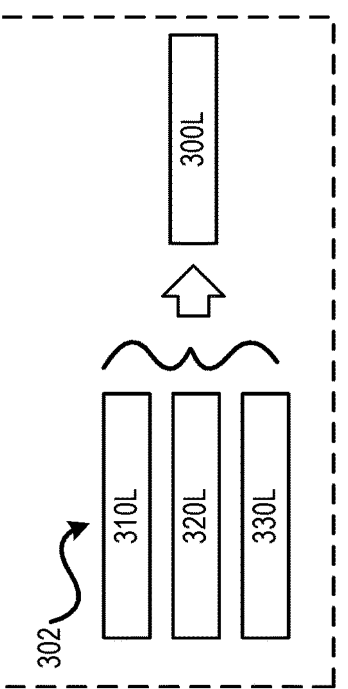
FIG. 3 shows a block diagram illustrating exemplary aspects of a user interface for identifying and remediating vulnerabilities in software code in accordance with the present disclosure.

In some aspects, a final label may be generated by the labelling engine 122. For example, when a trusted build of the software is completed, a label may be generated for the trusted build. In the context of the present disclosure, a trusted build of software may correspond to a software build in which various vulnerabilities have been identified and mitigated. For example, the security server 110 may provide functionality for identifying vulnerabilities based on the tool outputs and recommendations to mitigate the identified vulnerabilities. To illustrate and referring to FIG. 3, a block diagram illustrating an exemplary user interface for identifying and mitigating software vulnerabilities in accordance with the present disclosure is shown as a user interface 300. As shown in FIG. 3, the user interface 300 may include various display regions 310, 320, 330, each of which may correspond to a different tool used to evaluate and identify vulnerabilities in the software under consideration. The information presented in the various display regions 310, 320, 330 may enable a user to view and identify vulnerabilities and issues identified by the different tools.

For example, the display region 310 include a plurality of fields 311, 312, 313, 314, 315, 316, 317, 318. The fields 311-318 may present information associated with vulnerabilities identified by a first tool, where the fields 311, 315 may identify the location of first and second identified vulnerabilities (e.g., a file containing code of the software evaluated by the tool, etc.), fields 312, 316 may present information associated with a severity rating for the identified vulnerabilities (e.g., high, medium, low, etc. as determined by the tool), the fields 313, 317 may include information associated with a classification of the identified vulnerabilities, and the fields 314, 318 may provide a description of the identified vulnerabilities (e.g., that a particular variable in the code is not used, etc.).

Display region 320 corresponding to a second tool for identifying vulnerabilities is shown to include regions 322, 324, 326, 328, which may present various types of information for vulnerabilities identified by a second tool. For example, region 322 may present information associated with ratings of vulnerabilities (e.g., critical, high, low, etc.) specific to the second tool; region 324 may present information describing the identified vulnerability (e.g., Main should not throw anything); region 326 may present information indicating locations of the identified vulnerabilities; and region 328 may present information associated with tags corresponding to the identified vulnerabilities (e.g., analyzability, maintenance, functionality, etc.). Similarly, display region 330 may include rows 332, 334, 336, 338 presenting information associated with vulnerabilities identified using a third tool.

In an aspect, the user interface 300 may also include regions 310, 320L, 330L, and 300L. The regions 310L, 320L, 330L may display labels associated with the results or outputs of each of the tools 310, 320, 330. The region 300L may display a label associated with the combined results of the tools 310, 320, 330. For example, as shown at 302 in FIG. 3, the labels associated with regions 310L, 320L, 330L may be utilized to determine a composite or total label for the evaluated software, shown as label 300L. The label 300L may be determined based on one or more weighting factors associated with each of the labels 310L, 320L, 330L, and may indicate a total level of trust with respect to one or more metrics for which the software evaluated using the tools 310, 320, 330. For example, the tools 310, 320, 330 may be used to evaluate the software for security vulnerabilities and the outputs of each tool may be analyzed as described above. Weights may be applied to the labels of each tool according to the coverage or another metric, and the label 300L may be determined based on the weighted combination of the tools, which may provide a transparent and trustworthy reference for the evaluated feature(s) of the software. It is noted that the above-described labels 310L, 320L, 330L, 300L may be generated at multiple phases during the software development lifecycle, as described in more detail below with reference to FIG. 4.

Referring back to FIG. 1, the various types of information presented in the vulnerability interface provided by the security server 110 may enable a user (e.g., a software developer) to identify various types of vulnerabilities present in the software, as well as information for locating the cause or reason a portion of the code was identified as a vulnerability. Such information may enable the software code to be modified, where appropriate, to remediate the vulnerabilities identified using one or more tools, thereby improving the overall quality of the code with respect to one or more criteria that may be used to evaluate and label the software, as described above. As vulnerabilities are identified during the coding process (e.g., initial development, testing, design, updates, etc.) and remediated, additional evaluations using the tool(s) may be performed and additional vulnerabilities may be identified and/or determined to be resolved. As the remediations take place, the labels associated with the software may be updated to reflect the current state of the software and its respective vulnerabilities.

As shown in FIG. 1, the security server 110 may be communicatively coupled to one or more servers 150 and a data store 160. In an aspect, the software evaluated by the security server 110 may be stored in the data store 160, which may include different versions or builds of the software undergoing vulnerability assessment. Maintaining copies of the various versions of the software in the data store 160 may enable auditing of the labelling and evaluation functionality provided by the security server 110, such as to re-run various types of tool-based evaluation of different builds of the software to verify the deterministic nature of the security server 110's functionality and/or to track the coding capabilities and practices of one or more software developers. The software evaluated by the security server 110 may be developed on or intended for deployment on the server 150. Where the server 150 corresponds to the platform on which the software is developed, the security server 110 may retrieve appropriate code and other software information for evaluation by the tools and functionality of the security server 110. Where the server 150 corresponds to the target deployment environment for the software, the security server 110, and more particularly, the monitoring engine 124, may communicate with the server 150 to retrieve information regarding the configuration of the server 150 to facilitate evaluation and consideration of the target environment in identifying potential vulnerabilities and/or compliance with requirements for the software. Additionally or alternatively, the software may be deployed in a cloud-based platform, as shown by application(s) 174, and relevant information for evaluating the software may be retrieved from the cloud-based platform.

As shown above, the security server 110 and the functionality it provides enable various types of multi-dimensional analysis to be performed with respect to identification and evaluation of vulnerabilities for software. It is noted that the exemplary functionality described above also enables different pieces of software to be comparatively evaluated for compliance with multiple criteria, as well as using standardized assessment techniques that account for differences in how different tools may quantify risks associated with identified vulnerabilities. Furthermore, the labelling techniques provided by the labelling engine 122 of the security server 110 enable software to be labeled in a manner that enables users to interpret and understand the trustworthiness and potential risks of different pieces of software. Additionally, the disclosed techniques enable different pieces of software to be evaluated in different ways based upon the same or different types of information (e.g., by using weighting or other techniques) to accommodate different criteria and prioritization of the same when evaluating software.

A variety of techniques may be used to facilitate distribution of the labels to enable stakeholders to view the information represented by the labels and evaluate software. For example, the labels may be applied to software packaging or displayed on a website of a software vendor. Additionally or alternatively, information generated by the security server 110, such as the labels described herein, may also be stored in a blockchain 180. In an aspect, the blockchain 180 may be maintained by an entity responsible for auditing and certifying security and trustworthiness of applications. To illustrate, the entity may maintain the blockchain 180 and may provide information recorded to the blockchain 180 to third parties to enable them to evaluate security and trustworthiness of applications. In an aspect, the blockchain 180 may be a public blockchain that may be freely queried to obtain information regarding labels and analysis performed in accordance with the concepts described herein. In an additional or alternative aspect, the blockchain 180 may be a private blockchain and information (e.g., security and trustworthiness information) may be obtained from the blockchain 180 by entities having appropriate permissions. For example, entities seeking to evaluate software using labels generated in accordance with aspects of the present disclosure may register with the auditor entity to obtain appropriate permission to extract information (e.g., security and trustworthiness information) from the blockchain 180 regarding applications of interest. In an aspect, the blockchain 180 may include one or more smart contracts configured to retrieve labels and related information (e.g., information regarding specific metrics and analysis upon which the labels are derived) from the blockchain 180 corresponding to an application that has been evaluated in accordance with the concepts described herein. As briefly mentioned above, the labels generated in accordance with the present disclosure may include or be encoded within a barcode or quick response (QR) code, which may be scanned to access relevant information from the blockchain. In an aspect, the blockchain 180 may maintain a history of the labels and supporting metrics (e.g., vulnerability analysis, measurements, etc.) over time, which may enable different versions of applications to be tracked for security and trustworthiness over time. This may enable the security and trustworthiness of applications and software to be tracked over time, such as to enable evaluation of different versions of software. The blockchain 180 may also be used to benchmark applications and software with respect to security and vulnerability information, allowing industry participants to compare software and identify best of class software packages across a variety of metrics (e.g., performance, security, etc.).

Figure 4:
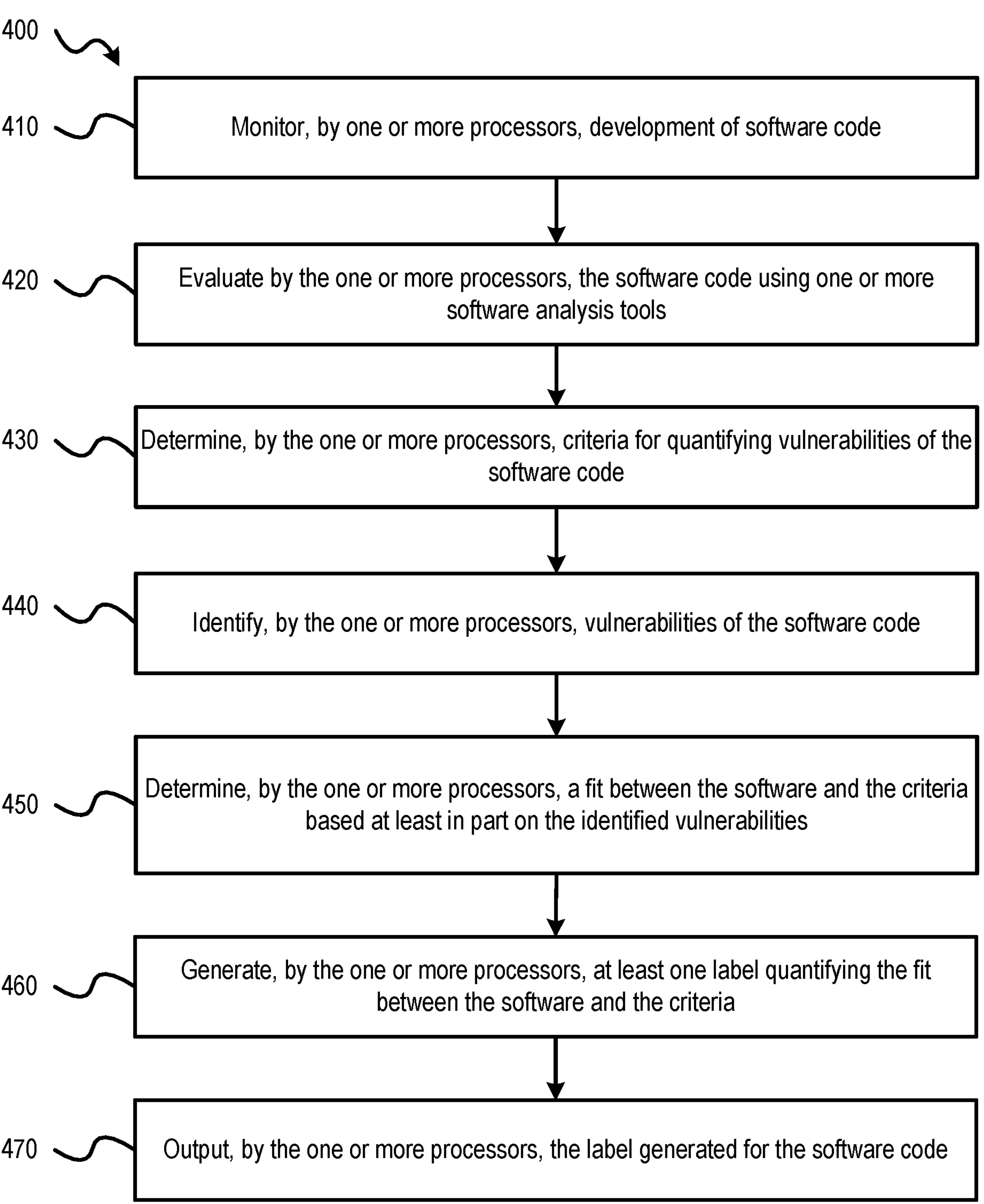
FIG. 4 is a flow diagram illustrating an exemplary method for quantifying software vulnerabilities in accordance with the present disclosure.

Referring to FIG. 4, a flow diagram illustrating an exemplary method for quantifying software vulnerabilities in accordance with the present disclosure is shown as a method 400. In an aspect, the method 400 may be performed by a computing device, such as the security server 110 or the user device 130 of FIG. 1, or via a cloud-based system, such as cloud-based security service 172 of FIG. 1. In an aspects, steps of the method 400 may be stored as instructions (e.g., the instructions 116 of FIG. 1) that, when executed by one or more processors (e.g., the one or more processors 112 of FIG. 1), cause the one or more processors to perform operations corresponding to the steps of the method 400.

At step 410, the method 400 includes monitoring, by one or more processors, development of software code. As described above, the monitoring may include obtaining, by the one or more processors, a copy of the software code at one or more phases of the software code development. At step 420, the method 400 includes evaluating, by the one or more processors, the software code using one or more software analysis tools. As described above herein, each software analysis tool of the one or more software analysis tools is configured to output tool specific information associated with vulnerabilities identified in the software code. At step 430, the method 400 includes determining, by the one or more processors, criteria for quantifying vulnerabilities of the software code and at step 440, identifying, by the one or more processors, vulnerabilities of the software code. Additionally, the method 400 includes, at step 450, determining, by the one or more processors, a fit between the software and the criteria based at least in part on the identified vulnerabilities. At step 460, the method 400 includes generating, by the one or more processors, at least one label quantifying the fit between the software and the criteria and at step 470, outputting, by the one or more processors, the label generated for the software code. It is noted that the method 400 may include additional operations consistent with the operations described herein and illustrated with reference to FIGS. 1-3 and FIG. 5.

The system enables regulations and standards based normalization of tool outputs, which may enable quantification of the security and trustworthiness of an application or piece of software in a standardized manner that is currently not possible due to differences in how various tools identify vulnerabilities and associate vulnerabilities with severity ratings. Often tools run varied rules on the application to provide insights on the application based on the defined parameters. The end user is unaware of the credibility of the rules applied by each tool or how to compare outputs of different tools. For example, a tool may project an application to be "secure" but the application might not always be secure simply because a tool reports such output (e.g., because the tool may not evaluate the application for all vulnerabilities or may not be capable of detecting certain vulnerabilities that may otherwise render the application unsecure. Using the techniques disclosed herein, results output by different tools are normalized to provide a standardized mechanism for quantifying the security and trustworthiness of an application. Standardization of the tool outputs on various phases of the software supply chain may also provide a more wholistic approach to evaluating application security, allowing end-to-end evaluation of the security and trustworthiness of an application and evaluation of software development lifecycle practices of software developers. Standards and policies used to apply labels to different phases of the software development lifecycle of a given application may provide a ranking mechanism for evaluation of software and applications despite outputs of different software evaluation tools providing diver results or outputs. For example, according to the standards and principals of the various frameworks such as NIST, simple and concrete labels are generated to overcome the complexity of understanding and interpreting various ranking mechanisms used by the assessments tools to rank and rate software. The labels generated in accordance with the present disclosure may be granular and can provide both abstract and detailed information regarding the activities, processes, and people involved in the execution of tools for assessment for enhanced interpretation. The labels may also facilitate clear communication amongst stakeholders, both in terms of understanding the characteristics of the software and to assist software producers to express their secure software practices to their customers, or define requirements for their suppliers. The exemplary processes described herein provide a mechanism for incorporating standards into processes for software vulnerability analysis and the labels may be used for conditional deployments and trust certifications. The labels also enable assessment of software delivery lifecycle compliant cloud deployments and migrations, such as by considering deployment environment configurations. The labels may also facilitate a pre-acquisition compliance check for understanding the security health of the system as well as evaluate desired characteristics in the software in order to identify high quality software (e.g., with lesser vulnerabilities).

Below, a working example is described to illustrate various aspects of the operations and functionality described above with reference to FIGS. 1-4. In this example, software for encrypting data is analyzed using industry tools and results of the analysis by the industry tools is used to generate various labels that quantify the various aspects of the of the software, such as the presence of vulnerabilities, phases of the SDLC of the software, and the like. Additionally, as described above, the label generation functionality of the present disclosure may standardize the results output by each of the tools used to analyze the software, which provides a mechanism for accounting for differences in the outputs of the different tools and enabling evaluation or comparison of different pieces of software in a more trustworthy and transparent manner.

For this example, suppose security analysis of the software was performed using three different tools, Tool 1, Tool 2, and Tool 3. The outputs obtained by each of the tools are shown in Table 1 below, where the first column identifies each tool, the second column identifies the severity rating associated with each identified vulnerability, and the type of vulnerability is shown in the third column. As can be seen in Table 1, Tool 1 identified 2 vulnerabilities with "Medium" severity according to Tool 1's severity rankings configuration; Tool 2 identified 4 vulnerabilities, 2 "Critical" and 2 "High" in terms of Tool 2's severity rankings configuration; and Tool 3 identified 6 vulnerabilities, with 1 classified as 1 "Critical", 1 classified as "Minor", 1 classified as "Info", and 3 classified as "Major" according to Tool 3's severity rankings configuration.

TABLE 1

| Tool | Severity | Vulnerability | Coverage |
|---|---|---|---|
| 1 | Medium | Variable 'md1' is not used | 0 |
| 1 | Medium | Variable 'md2' is not used | 1 |
| 2 | High | Main should not throw anything | 0 |
| 2 | Critical | Cipher with no integrity | 3 |
| 2 | Critical | Avoid using Rsa algorithm with OAEP | 0 |
| 2 | High | Use of system.out.printh | 0 |
| 3 | Critical | Make sure using a non-standard cryptographic algorithm is safe here | 0 |
| 3 | Info | Complete the task associated to this TODO comment | 0 |
| 3 | Major | Remove this useless assignment to local variable 'c1' | 0 |
| 3 | Major | Remove this useless assignment to local variable 'c2' | 0 |
| 3 | Major | Remove this useless assignment to local variable 'c3' | 0 |
| 3 | Minor | Remove the declaration of thrown exception 'java.io.IOException', as it cannot be thrown from method's body | 4 |

As explained above and as can be appreciated from Table 1 above, each of the tools identified different vulnerabilities and utilized different severity ranking configurations (e.g., Medium, Minor, High, Major, Critical, and Info). As explained above, such differences can make it difficult to properly evaluate the security of the software. However, the techniques disclosed herein provide mechanisms for normalizing the results of the tools to provide a uniform evaluation of the security of the software.

For example, the fourth column shows metrics indicating a number of security vulnerabilities guidelines or standards (e.g., NIST standards or other standards) covered by the results output by each tool, which may be used to calculate a coverage factor for each tool. To illustrate, suppose that the outputs of Tool 3 covered 4 different guidelines and that the 1 guideline covered by the outputs of Tool 1 and the 2 different guidelines covered by the outputs of Tool 2 each correspond to one of the 4 guidelines covered by the outputs of Tool 3, resulting in a total of 4 guidelines being covered by the outputs of the 3 tools combined. In such a scenario, the coverage metrics may be used to calculate weights or a coverage factor for each tool. For example, the weights may be calculated based on the total number of vulnerabilities found by each tool relative to the maximum number of guidelines covered by the tools. For example, the weights may be calculated as follows:

$$\text{Weight of Tool 1}=\tfrac{1}{4}=\tfrac{1}{4}\text{ or }0.25$$

$$\text{Weight of Tool 2}=\tfrac{3}{4}=\tfrac{3}{4}\text{ or }0.75$$

$$\text{Weight of Tool 3}=4/4=1$$

The weights may be utilized to map the outputs of each tool to a common format or scoring system. As noted above, each tool may map the severity of each identified vulnerability to a severity rating, however, it may be difficult to objectively quantify the severity ratings of the different tools with respect to each other. Accordingly, embodiments of the present disclosure may normalize the scores associated with each of the tools, as shown in Table 2 below:

TABLE 2

| | Tool 1 | Tool 2 | Tool 3 | Total |
|---|---|---|---|---|
| | | Weights | | |
| | 0.25 | 0.75 | 1 | Score |
| Unused variables [Low] | 1 | 1 | 1 | 2 |
| Avoiding use of printIn [Medium] | 0 | 1 | 1 | 1.75 |
| Do not throw simple exceptions [Low] | 0 | 0 | 1 | 1 |
| Weaker hash functions [High] | 0 | 1 | 1 | 1.75 |

As shown in Table 2 above, the common vulnerability scoring system may associate each of the vulnerabilities identified by the various tools with a common severity rating. Applying the weights of each tool to the vulnerabilities identified by the tools reveals a total score for each vulnerability, shown in Table 2 as: 2 for unused variables (e.g., 2=0.25*1+0.75*1+1*1); 2 for avoiding the use of printIn (e.g., 1.75=0.25*0+0.75*1+1*1); 1 for do not throw simple exceptions (e.g., 1=0.25*0+0.75*0+1*1); and 1.75 for weaker hash functions (e.g., 1.75=0.25*0+0.75*1+1*1). The normalized scores may be used to generate a vector representing the normalized vulnerability score for the application under consideration. For example, the normalized vulnerability score for the application in the example above may be: [Application: 3, 1.75, 1.75, 0], where 3 represents the cumulative severity score for [Low] severity vulnerabilities, 1.75 represents the cumulative severity score for [Medium] severity vulnerabilities, 1.75 represents the cumulative severity score for [High] severity vulnerabilities, and 0 represents the cumulative severity score for [Critical] severity vulnerabilities according to the common vulnerability severity system from Table 2.

The common vulnerability severity scoring may also be used to determine ideal positive and negative ideal solutions. For example, suppose the vulnerabilities identified by each of the 3 tools in the example above were scored as follows:

TABLE 3

| Common Severity Ratings | Low | Medium | High | Critical |
|---|---|---|---|---|
| Tool 1 | 2 | 1 | 0 | |
| Tool 2 | 2 | 14 | 12 | 12 |
| Tool 3 | 9 | 21 | 29 | 3 |

Summing the vulnerability scores for each of the common severity ratings across all vulnerabilities identified by the 3 tools reveals cumulative scores of 14, 26, 31, and 15 for Low, Medium High, Critical vulnerabilities, respectively. Applying the weights associated with each tool to these ratings reveals that the negative ideal solution would have a Low severity rating score of 11 (e.g., 0.25*2+0.75*2+1*9=11), a Medium severity rating score of 31.75 (e.g., 0.25*1+0.75*14+1*21=31.75), a High severity rating score of 38 (e.g., 0.25*0+0.75*12+1*29=38), a Critical severity rating score of 12 (e.g., 0.25*+0.75*12+1*3=12). It is noted that the negative ideal solution represents a hypothetical solution that accounts for the capabilities of the various tools used to evaluate a given application (e.g., by accounting for the weights associated with each tool). A positive ideal solution may also be generated, which may have a vector of [0, 0, 0, 0] since ideally an application would have no vulnerabilities associated with Low, Medium, High, and Critical vulnerabilities (e.g., using the common vulnerability scoring system used to normalize the vulnerabilities identified by each tool).

The various scores and vectors identified above may be utilized to perform TOPSIS analysis, as described above with reference to FIG. 2. For example, the vector determined for the application (e.g., [Application: 3, 1.75, 1.75, 0]) may be utilized to calculate a distance between the positive ideal solution (i.e., line 212 of FIG. 2) and the negative ideal solution (i.e., line 222 of FIG. 2). The distance may be calculated according to:

$$d_i^* = d(D_i \cdot A^*) = \sqrt{\sum_{j=1}^{3} \left(a_{ij} - a_j^*\right)^2},$$

where $d_i$ is the distance between each of the vectors. In the example above, the distance to the positive ideal solution may be 3.89 and the distance to the negative solution may be 59.07. The distances may be used to calculate a distance ratio according to:

$$D_i^* = \frac{d_i^0}{d_i^* + d_i^0} = \frac{d\left(A_i, A^0\right)}{d(A_i, A^*) + d\left(A_i, A^0\right)},$$

where $D_i$ is the distance ratio representing a closeness of the application with respect to conforming to the positive or negative ideal solutions (e.g., where values closer to 1 indicate an application more closely approximates the positive ideal solution and values closer to 0 indicate an application more closely approximates the negative ideal solution). In the example above the distance ratio ($D_i$) for the application is 0.93, meaning the application more closely approximates the positive ideal solution than the negative ideal solution. Using such techniques, different applications can be evaluated in a manner that enables consistent comparisons to be performed (e.g., due to the normalization of the different tools and comparisons to the positive and negative ideal solutions).

In an aspect, the distance ratio may be utilized to determine a label associated with the application being analyzed. For example, as shown in Table 4 below, ranges of distance ratio values may be determined and associated with different labels, where each label indicates a different security rating. By way of non-limiting example, Table 4 shows 5 labels "A"-"E", with "A" being associated with applications closely approximating or representative of the positive ideal solution, "E" being associated with applications closely approximating or representative of the negative ideal solution, and the labels "B", "C", and "D" representing various intermediary approximations of the positive or negative ideal solutions.

TABLE 4

| Ratio | Label |
|---|---|
| 0.8-1 | A |
| 0.6-0.79 | B |
| 0.4-0.59 | C |
| 0.2-0.39 | D |
| 0-0.19 | E |

Figure 5:
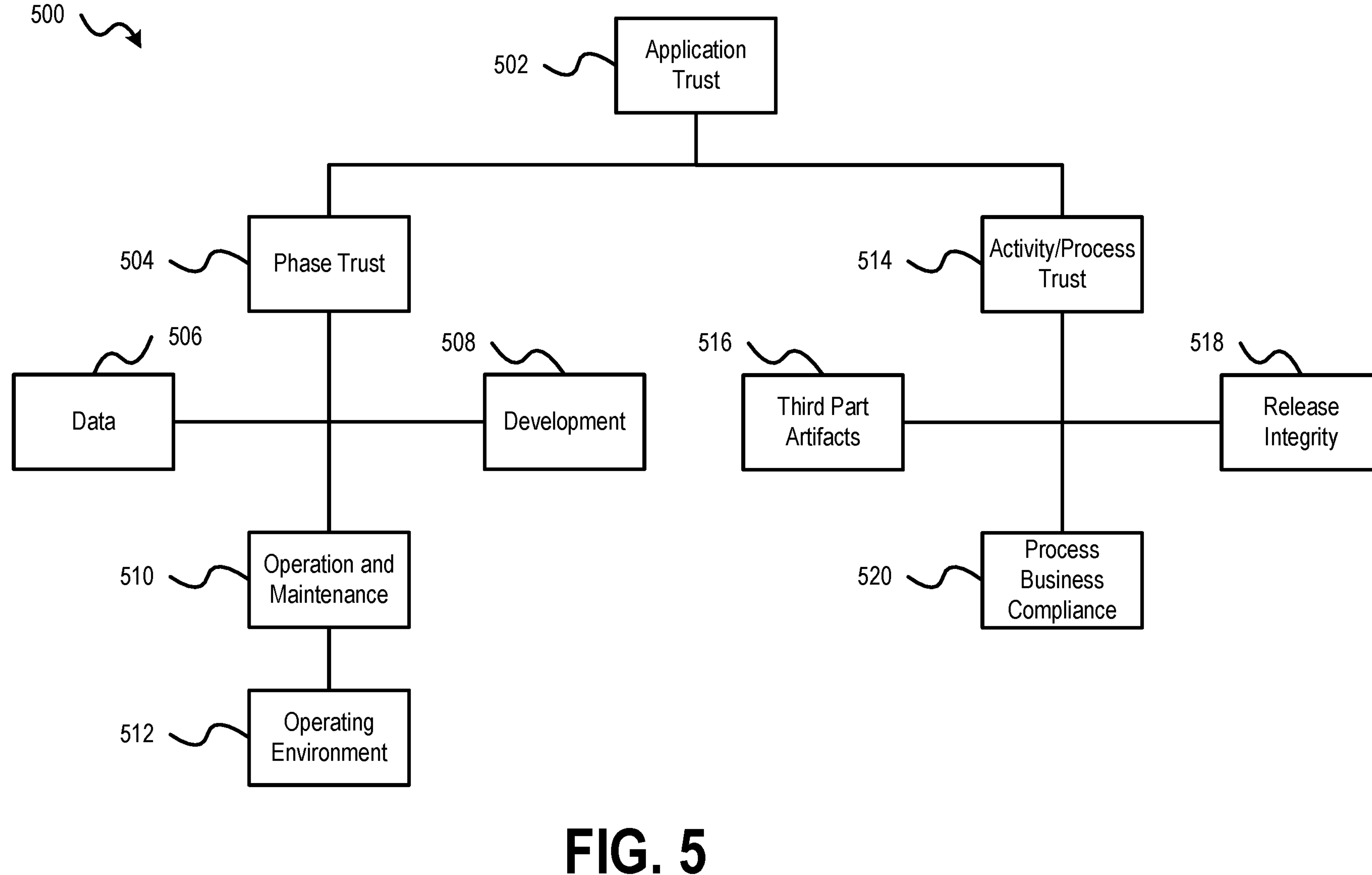
FIG. 5 is a block diagram illustrating exemplary phases of an application for which labels may be generated in accordance with aspects of the present disclosure.

Continuing with the example above and referring to FIG. 5, a block diagram illustrating exemplary phases of an application for which labels may be generated in accordance with aspects of the present disclosure is shown as a set of phases 500. As shown in FIG. 5, the set of phases 500 includes an application trust label 502, a phase trust label

504, a data label 506, a development label 508, and operations and maintenance label 510, an operating environment label 512, an activity/process trust label 514, a third party artifacts label 516, a release integrity label 518, and a process business compliance label 520. It is noted that the exemplary labels and associated phases shown in FIG. 5 have been provided for purposes of illustration, rather than by way of limitation and that embodiments of the present disclosure may be utilized with other phases instead of being limited to the specific examples shown in FIG. 5. Using the techniques described above, labels may be generated for an application across various aspects of the software development lifecycle. The application trust label 502 may represent a composite or comprehensive evaluation of the application based on the other labels shown in FIG. 5. Similarly, the phase trust label 504 may represent a composite label corresponding to labels 506, 508, 510, 512 and the activity/process trust label 514 may represent a composite label corresponding to labels 516, 518, 520.

The phase trust label 504 may provide insights into factors of interest for various stakeholders, such as client requirements adherence, security considerations, maintainability, performance issues, and the like. Each of these different factors may be evaluated using the labels associated with labels 506-512. In an aspect, the phase trust label 504 may include multiple scores, each associated with a different stakeholder who may prioritize the various factors considered differently. The factors may be weighted differently for each stakeholder to represent the priorities of each stakeholder, such as to prioritize performance over maintainability or to prioritize security over performance and client requirements adherence. The particular configuration of the weights may be different for different applications in some aspects.

The operating environment label 512 may represent a metric associated with an operating environment in which one or more evaluations of the application are obtained. For example, the operating environment label may be associated with a particular operating environment configuration (e.g., particular operating system, hardware configuration, etc.) and may serve as a certification label that one or more of the other labels were derived while the application was loaded in the operating environment configuration associated with the label 512. The operating environment label 512 may also serve to indicate an environment where testing and evaluation were performed, which may indicate that the testing of the performance of another aspect of the application may be "certified" as to that environment, but that performance may vary if the application is run in a different environment or different configuration of the same environment. In an aspect, multiple operating environments or configurations may be represented by the operating environment label 512.

The operation and maintenance label 510 may indicate aspects of the trustworthiness of a developer and the software development practices, for example, whether known vulnerabilities are routinely patched or allowed to remain in software code, etc. The development label 508 may represent aspects of the application evaluated in connection with the development of the application, such as analysis of vulnerabilities with respect to security, access control, and other aspects of the application's development. In an aspect, individual factors considered for the development label 508 may also be scored individually, such as to generate a security label, an access control label, and the like, which may be factored into the overall development label 508. The data label 506 may represent aspects of the application with respect to handling of data and any associated vulnerabilities, for example, whether weights used to encrypt data using artificial intelligence are stored in a secure or protected directory, whether encryption algorithms satisfy a desired level of data security, whether data is protected by access level security, and the like.

The third party artifacts label 516 may indicate vulnerabilities related to portions of code developed by third parties, such as when an application integrates open source code or other third party software packages into an application. The release integrity label 518 may represent aspects of the application evaluated with respect to build integrity, code integrity, or other aspects associated with an application. In an aspect, information associated with a version of the application may also be used to obtain the release integrity label 518, such as the track portions of the application that have changed from one release to another and only those portions that have been changed may be analyzed to obtain an updated release integrity label 518. The process business compliance label 520 may indicate how closely an application complies with desired business requirements or regulatory requirements.

As shown above, the various labels generated in accordance with aspects of the present disclosure provide a framework for enabling applications to be evaluated across a variety of metrics in a standardized way. This enables applications to be compared in a consistent manner across those various metrics to inform decision-making while providing flexibility to account for differences in factors of importance to various stakeholders. For example, an application may have sufficient performance for a first stakeholder who prioritizes performance over other factors, while a second stakeholder may determine the application is not suitable due to security factors indicated in the label(s). Additionally, the labelling process disclosed herein also enables comparison of different applications in a uniform way, enabling decision making processes to evaluate multiple applications across different metrics of importance while prioritizing appropriate business objectives (e.g., security, performance, etc.) in a trustworthy manner that is presently not possible due to technical limitations in prior tools and evaluation processes.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for identifying and quantifying software vulnerabilities, the method comprising:

monitoring, by one or more processors, development of software code, wherein the monitoring includes:

obtaining, by the one or more processors, a copy of the software code at one or more phases of the software code development;

evaluating, by the one or more processors, the software code using one or more software analysis tools, wherein each software analysis tool of the one or more software analysis tools is configured to output tool specific information associated with vulnerabilities identified in the software code;

determining, by the one or more processors, criteria for quantifying vulnerabilities of the software code;

identifying, by the one or more processors, vulnerabilities of the software code;

determining, by the one or more processors, a fit between the software and the criteria based at least in part on the identified vulnerabilities, wherein determining the fit between the software and the criteria comprises software solution recommendation using graphical representation that represents the fit of software to a plurality of criteria with respect to corresponding axes, wherein a horizontal axis of the graphical representation corresponds to a first criterion that represents an ideal software solution of the software solution recommendation and a vertical axis of the graphical representation corresponds to a second criterion that represents a negative ideal software solution of the software solution recommendation;

generating, by the one or more processors, at least one label quantifying the fit between the software and the criteria; and outputting, by the one or more processors, the label generated for the software code.

2. The method of claim 1, further comprising generating a model associated with the criteria.

3. The method of claim 1, wherein the label comprises a data structure.

4. The method of claim 3, wherein the data structure comprises a barcode or a quick response code.

5. The method of claim 1, wherein the at least one label comprises a plurality of labels, each label corresponding to a different portion of a software development lifecycle for the software code.

6. The method of claim 1, wherein the vulnerabilities identified using the one or more software analysis tools are associated with different severity ratings.

7. The method of claim 6, further comprising normalizing a severity rating of the identified vulnerabilities identified using the one or more software analysis tools.

8. A system comprising:

a memory; and one or more processors configured to:

monitor development of software code, wherein the monitoring includes:

obtaining, by the one or more processors, a copy of the software code at one or more phases of the software code development;

evaluate the software code using one or more software analysis tools, wherein each software analysis tool of the one or more software analysis tools is configured to output tool specific information associated with vulnerabilities identified in the software code;

determine criteria for quantifying vulnerabilities of the software code;

identify vulnerabilities of the software code;

determine a fit between the software and the criteria based at least in part on the identified vulnerabilities, wherein determining the fit between the software and the criteria comprises software solution recommendation using graphical representation that represents the fit of software to a plurality of criteria with respect to corresponding axes, wherein a horizontal axis of the graphical representation corresponds to a first criterion that represents an ideal software solution of the software solution recommendation and a vertical axis of the graphical representation corresponds to a second criterion that represents a negative ideal software solution of the software solution recommendation;

generate at least one label quantifying the fit between the software and the criteria; and output the label generated for the software code.

9. The system of claim 8, further comprising generating a model associated with the criteria.

10. The system of claim 8, wherein the label comprises a data structure.

11. The system of claim 10, wherein the data structure comprises a barcode or a quick response code.

12. The system of claim 8, wherein the at least one label comprises a plurality of labels, each label corresponding to a different portion of a software development lifecycle for the software code.

13. The system of claim 8, wherein the vulnerabilities identified using the one or more software analysis tools are associated with different severity ratings.

14. The system of claim 13, further comprising normalizing a severity rating of the identified vulnerabilities identified using the one or more software analysis tools.

15. A non-transitory computer-readable storage medium storing instructions that, when executed by one or more processors, cause the one or more processors to perform operations comprising:

monitoring development of software code, wherein the monitoring includes:

obtaining a copy of the software code at one or more phases of the software code development;

evaluating the software code using one or more software analysis tools, wherein each software analysis tool of the one or more software analysis tools is configured to output tool specific information associated with vulnerabilities identified in the software code;

determining criteria for quantifying vulnerabilities of the software code;

identifying vulnerabilities of the software code;

determining a fit between the software and the criteria based at least in part on the identified vulnerabilities, wherein determining the fit between the software and the criteria comprises software solution recommendation using graphical representation that represents the fit of software to a plurality of criteria with respect to corresponding axes, wherein a horizontal axis of the graphical representation corresponds to a first criterion that represents an ideal software solution of the software solution recommendation and a vertical axis of the graphical representation corresponds to a second criterion that represents a negative ideal software solution of the software solution recommendation;

generating at least one label quantifying the fit between the software and the criteria; and outputting the label generated for the software code.

16. The non-transitory computer-readable medium of claim 15, the operations further comprising generating a model associated with the criteria.

17. The non-transitory computer-readable storage medium of claim 15, wherein the label comprises a data structure.

18. The non-transitory computer-readable storage medium of claim 15, wherein the at least one label comprises a plurality of labels, each label corresponding to a different portion of a software development lifecycle for the software code.

19. The non-transitory computer-readable storage medium of claim 15, wherein the vulnerabilities identified using the one or more software analysis tools are associated with different severity ratings, the operations further comprising normalizing a severity rating of the identified vulnerabilities identified using the one or more software analysis tools.

20. The non-transitory computer-readable storage medium of claim 19, the operations further comprising calculating, based at least in part on the normalized severity ratings of the identified vulnerabilities, a distance ratio with respect to the software code, a positive ideal solution, and a negative ideal solution, wherein the at least one label is based at least in part on the distance ratio.

* * * * *